United States Patent [19]

Tandler

[11] 4,317,598
[45] Mar. 2, 1982

[54] DUAL-CIRCUIT PRESSURE REGULATOR

[75] Inventor: Peter Tandler, Königstein, Fed. Rep. of Germany

[73] Assignee: ITT Industries, Inc., New York, N.Y.

[21] Appl. No.: 131,717

[22] Filed: Mar. 19, 1980

[30] Foreign Application Priority Data

Apr. 19, 1979 [DE] Fed. Rep. of Germany ....... 2915866

[51] Int. Cl.³ .............................................. B60T 8/26
[52] U.S. Cl. .................................................. 303/6 C
[58] Field of Search ............... 188/349; 303/6 C, 6 R, 303/22 R, 24 F, 84 A, 84 R

[56] References Cited

U.S. PATENT DOCUMENTS

| | | | |
|---|---|---|---|
| 3,669,505 | 6/1972 | Falk | 303/6 C |
| 3,969,000 | 7/1976 | Ohta et al. | 303/6 C |
| 4,036,535 | 7/1977 | Katoh | 303/6 C |

*Primary Examiner*—Duane A. Reger
*Attorney, Agent, or Firm*—John T. O'Halloran; Alfred C. Hill

[57] ABSTRACT

Dual-circuit pressure regulators for brake systems are known in which the two valve pistons are acted upon by means of two separate control springs. In this known arrangement, it is difficult to make the forces of the two control springs equal and the forces of the two control springs are not adjustable. To overcome these disadvantages, the dual-circuit pressure regulator of the present invention employs a single control spring common to the two valve pistons and one valve-closing member interacts with an auxiliary housing which is shiftable relative to a main housing and can be locked in a selected position in the main housing. The force of the control spring is determined by the position of the auxiliary housing in the main housing.

24 Claims, 4 Drawing Figures

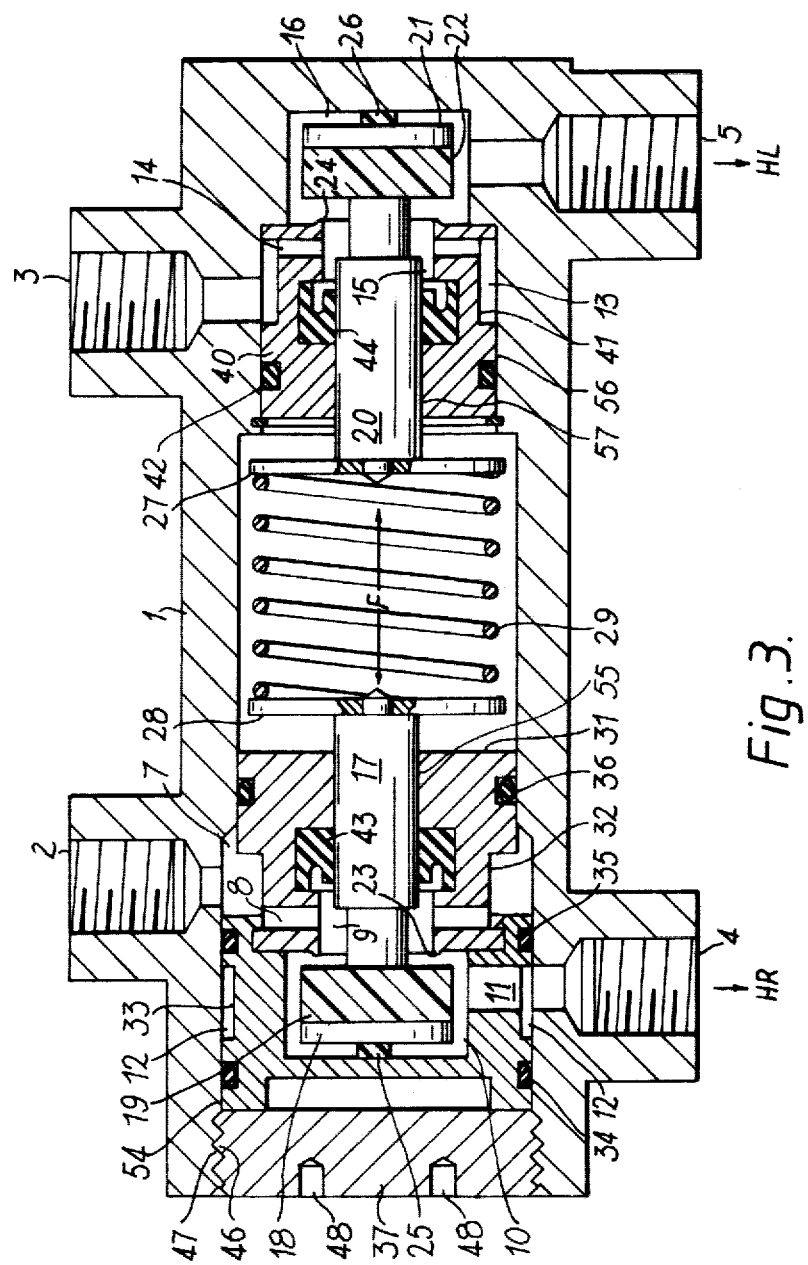

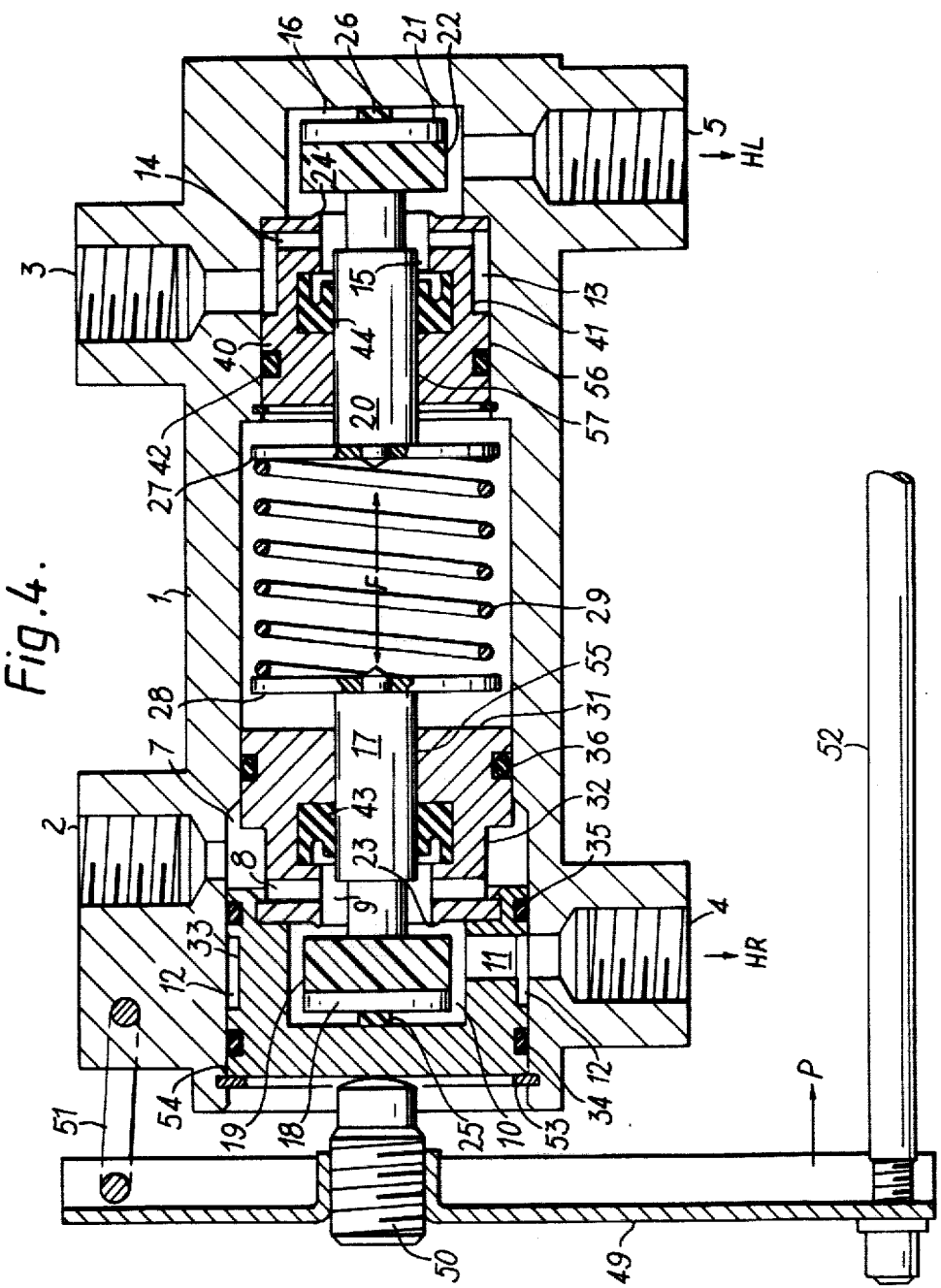

DUAL-CIRCUIT PRESSURE REGULATOR

BACKGROUND OF THE INVENTION

This invention relates to a dual-circuit pressure regulator with a cylindrical main housing, a first inlet chamber and a first outlet chamber connected therewith in the one end area of the main housing, with a second inlet chamber and a second outlet chamber connected therewith in the other end area of the main housing. A first pressure regulating valve is inserted between the first inlet chamber and the first outlet chamber and loaded with a control force in the opening direction by means of a spring, and a second pressure regulating valve is inserted between the second inlet chamber and the second outlet chamber which is horizontally opposed to the first pressure regulating valve and likewise loaded with a control force in the opening direction by means of a spring. Each of the first and second inlet chambers are connected with a source of pressure, in particular a different pressure circuit of a tandem master cylinder of an automotive vehicle and each of the first and second outlet chambers are connected with a pressure-consuming device, in particular a different one of the wheel brake cylinders of the rear axle of the automotive vehicle. Each of the first and second pressure regulating valves will close on attainment of a control pressure in the associated one of the inlet and outlet chambers which is predetermined by the control force and, with the pressure in the inlet chambers continuing to increase, will influence the pressure in the outlet chambers in accordance with a predetermined control behavior.

Dual-circuit pressure regulators of the aforementioned type are mainly used for automotive vehicles and serve to regulate the braking force of individual wheels. Since during braking it is particularly the rear wheels that tend to lock easily, their brake force must be reduced or limited relative to the braking force of the front wheels. For this purpose, the wheel brake cylinders of the rear wheels are connected to the outlet chambers of the dual-circuit pressure regulator, the inlet chambers of the dual-circuit pressure regulator are connected to the master brake cylinder which in turn is also connected to the wheel brake cylinders of the front wheels.

From British Pat. No. 1,253,507, published Nov. 17, 1971, a single-circuit pressure regulator is known wherein the control force of a spring for the pressure regulating valve can be set to various values in assembly. For this purpose, the abutment of the spring is shifted in the regulator housing by a suitably large amount and then secured in position.

From the U.S. Pat. No. 3,970,347, issued July 20, 1976, a dual-circuit pressure regulator is known which operates as a pressure reducer. In this known dual-circuit pressure regulator, each of the two pressure regulating valves possesses a separate spring of its own exerting a control force on the associated pressure regulating valve in the opening direction. Considering, however, that springs have manufacturing tolerances, it is not easy to set the same control force for both pressure regulating valves. Unequal control forces however, result in unequal control pressures. If in a vehicle a dual-circuit brake system with diagonally split brake circuits is provided, i.e., the right-hand front wheel and the left-hand rear wheel form one brake circuit, while the left-hand front wheel and the right-hand rear wheel form the other brake circuit different brake forces will act on the rear wheels.

Moreover, in this known dual-circuit pressure regulator, the control forces can be only changed by the use of springs of different strengths. If dual-circuit pressure regulators with different control forces are to be provided for different types of vehicle, the springs employed must be suitably different, too.

SUMMARY OF THE INVENTION

It is an object of the present invention to provide a dual-circuit pressure regulator whose pressure regulating valves are invariably loaded with the same control force and which permits the setting of various control pressures without the need of changing the component design, while at the same time resulting in simplified design.

A feature of the present invention is the provision of a dual-circuit pressure regulator comprising: a main housing; a first inlet chamber and a first outlet chamber connected to the first inlet chamber disposed in and adjacent one end of the main housing, the first inlet chamber being connected to one pressure circuit of a tandem master cylinder and the first outlet chamber being connected to a wheel brake cylinder of one of a pair of rear wheels of a vehicle; a second inlet chamber and a second outlet chamber connected to the second inlet chamber disposed in and adjacent the other end of the main housing, the second inlet chamber being connected to the other pressure circuit of the master cylinder and the second outlet chamber being connected to a wheel brake cylinder of the other of the pair of rear wheels; a first pressure regulating valve disposed between the first inlet chamber and the first outlet chamber and loaded with a control force in the valve opening direction of the first valve; a second pressure regulating valve disposed between the second inlet chamber and the second outlet chamber and loaded with with the control force in the valve opening direction of the second valve which is opposite the valve opening direction of the first valve; the first and second valves are closed upon attainment of a control pressure determined by the control force and will influence the pressure in their associated one of the first and second outlet chambers in accordance with a predetermined control behavior upon a further increase of pressure in their associated one of the first and second inlet chambers; a single, common spring arrangement disposed in the main housing between the first and second valves to oppositely load the first and second valves with the control force; and an auxiliary housing containing at least the first valve disposed in the main housing and slideable therein relative to the second valve to enable adjustment of the control force, the auxiliary housing being adapted to be secured in a fixed position after adjustment of the control force is completed.

This arrangement enables the distance between the pressure regulating valves and, thus, the preload of the spring arrangement to be set by shifting the auxiliary housing inwardly by a greater or lesser amount. Additionally, this arrangement permits manufacturing tolerances in the spring arrangements to be compensated for, i.e., it is possible to achieve the same control force with spring arrangements of different strengths. Thus, in contrast to the known dual-circuit pressure regulator, the necessity of providing additional measures to set the control force and/or to balance the strengths of two springs is obviated. On the other hand, when using identical spring arrangements, according to present invention it is possible to realize different control forces by suitably shifting the auxiliary housing, so that, in contrast to the known dual-circuit pressure regulator, the same parts can be used invariably to obtain different control forces, with the outer form of the main housing with its inlets and outlets remaining unchanged. It is thereby possible to simplify the assembly materially. Incidentally, the control forces applied to the two valves are exactly alike.

In a preferred embodiment, the auxiliary housing is designed like a piston and is disposed in a cylindrical bore of the main housing extending from the one end face of the main housing.

The auxiliary housing in the preferred embodiment encloses the first inlet and outlet chambers and has an inlet line to connect the first inlet chamber with the first inlet and an outlet line to connect the first outlet chamber with the first outlet. Thus, the dual-circuit pressure regulator of the present invention may be preferably assembled from larger, previously assemblied subassemblies, thus, permitting particular economy of manufacture.

In the above described preferred embodiment, the auxiliary housing has a first outer annular groove into which the inlet line opens and a second annular groove into which the outlet line opens with the axial distance beteen the first and second annular grooves corresponding to the axial distance between the first inlet and the first outlet. Thus, the inlet and inlet line and the outlet and outlet line are not in alignment.

In the above described preferred embodiment, the first and second annular grooves have an axial width corresponding to at least the diameter of the associated one of the inlet and outlet bore plus a predetermined displacement distance of the auxiliary housing within the main housing resulting in the inlet and outlet having preferably a relatively small cross-section.

In the above described preferred embodiment, the spring arrangement aids in securing the auxiliary housing in position by urging the auxiliary housing against a stop fastened in the main housing.

Several embodiments of the above mentioned stop for the auxiliary housing are disclosed with certain of these stops enabling the setting of the control force after asembly of the dual-circuit pressure regulator.

In accordance with the present invention the control pressure of the dual-circuit pressure regulator can be changed dependent upon a reference input, for example, upon the load of a vehicle.

In accordance with a further feature of the present invention the second pressure regulating valve can be combined with the second inlet chamber to form a subassembly.

Still another feature of the present invention is the provision of methods of manufacturing a dual-circuit pressure regulator of the present invention which enable setting the control force at the time of assembly of the dual-circuit pressure regulator without difficulty.

BRIEF DESCRIPTION OF THE DRAWING

Above-mentioned and other features and objects of this invention will become more apparent by reference to the following description taken in conjunction with the accompanying drawing, in which:

FIG. 3 is a partial longitudinal cross-sectional view of a variation of the embodiment of FIG. 2; and FIG. 4 is a partial longitudinal cross-sectional view of another embodiment of a dual-circuit pressure regulator in accordance with the principles of the present invention wherein the position of the auxiliary housing can be changed in operation by means of a lever system.

DESCRIPTION OF THE PREFERRED EMBODIMENTS

Figure 1:
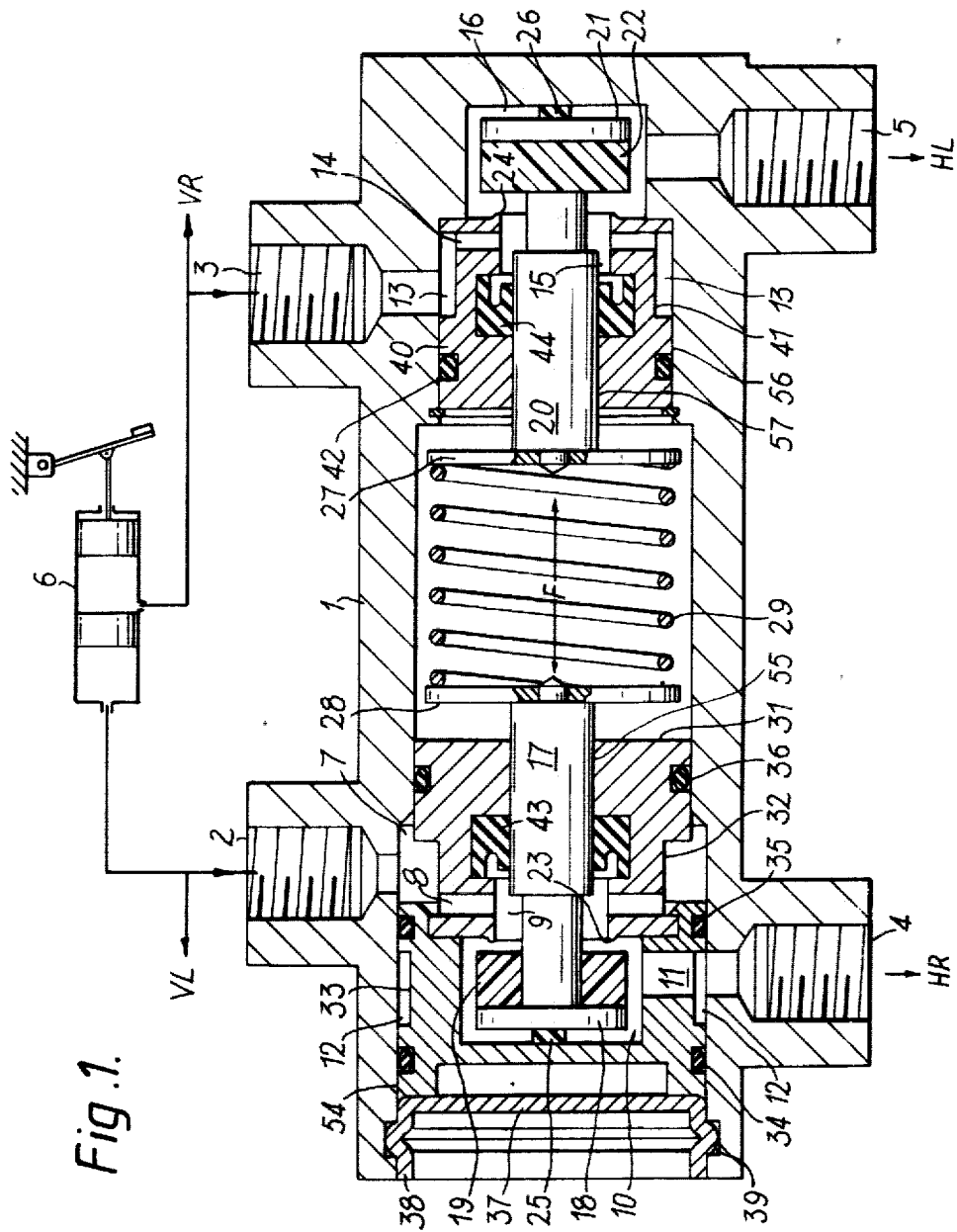
FIG. 1 is a partial longitudinal cross sectional view of a first embodiment of a dual-circuit pressure regulator in accordance with the principles of the present invention having the auxiliary housing secured in position.

Like elements have been assigned like reference numerals in all Figs.

Referring to FIG. 1, the dual-circuit pressure regulator of the present invention includes a main housing 1 with a cylindrical main blind-end bore tapering in steps in the manner shown from the open to the closed end, with a first inlet 2, a second inlet 3, a first outlet 4 and a second outlet 5.

As shown schematically, first inlet 2 and second inlet 3 are each connected to respective circuits of a tandem master brake cylinder 6. The connecting line between master brake cylinder 6 and first inlet 2 possesses a branch leading to the left-hand front wheel VL.

The connecting line between master brake cylinder 6 and second inlet 3 possesses a branch leading to the right-hand front wheel VR. First outlet 4 is connected to the wheel brake cylinder of the right-hand rear wheel HR and second outlet 5 is connected to the wheel brake cylinder of the left-hand rear wheel HL.

First inlet 2 opens into a first annular chamber 7 close to the inlet, which chamber is connected to the first cylindrical inlet chamber 9 situated within an auxiliary housing 31 via first radial inlet lines 8 located within auxiliary housing 31. Inlet chamber 9 opens into a coaxial, cylindrical first outlet chamber 10 of larger diameter than inlet chamber 9 from which an outlet line 11 arranged in auxiliary housing 31 branches radially. Outlet line 11 leads to an annular chamber 12 which is close to the outlet and connected to first outlet 4.

In a corresponding manner, second inlet 3 opens into a second annular chamber 13 close to the inlet, which chamber is connected to a second cylindrical inlet chamber 15 situated in an insert 40 via second radial inlet lines 14 located in insert 40. Second inlet chamber 15 opens into a coaxial, cylindrical second outlet chamber 16 on the closed end of main housing 1. Second outlet chamber 16 is directly connected to second outlet 5.

Arranged between the respective inlet and outlet chambers are pressure regulating valves. A first pressure regulating valve possesses a tappet 17 of circular cross-section and a valve body 18 of circular disc shape with a circular-ring-shaped sealing plate 19 which is arranged close to tappet 17 and made of an elastic plastic material. Sealing plate 19 has the same outside diameter as valve body 18.

In a corresponding manner, the second pressure regulating valve possesses a tappet 20 and a valve body 21 with a sealing plate 22.

Sealing plate 19 of the first pressure regulating valve cooperates with an annular valve seat 23 provided at the step between chambers 9 and 10 of auxiliary housing 31, and sealing plate 22 of the second pressure regulating valve cooperates with an annular valve seat 24 surrounding the orifice of inlet chamber 15 in insert 40.

The opening travel of both valves are limited by stops 25 and 26 on the outsides of valve bodies 18 and 21 remote from tappets 17 and 20. These stops may be arranged either on a bottom of the respective outlet chamber or on the valve body of the respective pressure regulating valve.

Valve tappets 17 and 20 carry at their respective ends remote from the valve bodies disc-like plates 27 and 28. Engaged between these plates is a single helical compression spring 29 loading the pressure regulating valves with a control force F in the opening direction.

Parallel to the pressure regulating valves 17 to 19 and 20 to 22 are check valves (not shown), wherein the sealing plate, in combination with the valve body, may be designed as check valve.

The first pressure regulating valve 17, 18, 19 is arranged in the piston-like, two-piece auxiliary housing 31 which is inserted in the manner of a piston in the first portion of main blind-end bore 54 where the diameter is the largest. In this arrangement, part of auxiliary housing 31 encloses first inlet chamber 9, the other part of the auxiliary housing encloses first outlet chamber 10. Both parts are formed fast with one another. Auxiliary housing 31 has on its outside two annular grooves 32 and 33 to form first annular chamber 7 close to the inlet and annular chamber 12 close to the outlet, respectively. Auxiliary housing 31 is sealed relative to main housing 1 by means of ring seals 34, 35 and 36.

If auxiliary housing 31 is shifted inwardly within cylindrical bore 54 of main housing 1 in the manner of a piston, spring 29 will be loaded with a correspondingly increasing force.

The force of spring 29 urges auxiliary housing 31 outwardly against a bottom plate 37 by means of which the open end of cylindrical bore 54 of main housing 1 is closed.

Bottom plate 37 consists of a piece of sheet metal having a rim 38 which is pressed into an inner groove 39 on the circumference of bore 54 and thereby secures bottom plate 37 in position.

The second pressure regulating valve 20, 21, 22 is accommodated in an insert 40 which encloses second inlet chamber 15 and possesses an outer annular groove 41 forming second annular chamber 13 close to the inlet. Insert 40 is likewise designed in the manner of a piston and has a diameter smaller than auxiliary housing 31, this diameter corresponding to the smaller diameter at the end of the main blind-end bore. Insert 40 is sealed relative to main housing 1 by means of a ring seal 42.

Passage bores 55 and 57 for valve tappets 17 and 20, respectively, in auxiliary housing 31 an in insert 40, respectively, are sealed relative to tappets 17 and 20 by means of lip seals 43 and 44, respectively.

Since the space enclosed by main housing 1 is designed as a stepped bore, insert 40 including therein the second pressure regulating valve 20, 21, 22 and auxiliary housing 31 including therein the first pressure regulating valve 17, 18, 19 can be placed into main housing 1 in the correct manner only. The possibility of wrong assembly is thereby precluded.

The mode of operation of the dual-circuit pressure regulator described is as follows. Via inlets 2 and 3, the pressure of tandem master cylinder 6 is supplied to outlet chambers 10 and 16 through annular chambers 7 and 13 close to the inlet, inlet lines 8 and 14 and inlet chambers 9 and 15. From first outlet chamber 10, pressure is supplied through outlet line 11 to annular chamber 12 close to the outlet and thus to outlet 4. From second outlet chamber 16, the pressure is directly supplied to outlet 5.

When the pressure exceeds a control pressure which is predetermined by control force F of spring 29, valve bodies 18, 19 and 21, 22 will be urged against valve seats 23 and 24. Thereby inlet chambers 9 and 15 are isolated from outlet chambers 10 and 16. Since valve seats 23 and 24 have a diameter greater than the ends of valve tappets 17 and 20 which are slidably guided in respective passage bores 55 and 57 in auxiliary housing 31 and insert 40, respectively, the pressure regulating valves operate as pressure reducers so that the valve bodies 18, 19 and 21, 22 will be in a state of instable equilibrium in the presence of the control pressure. With the pressure in inlet chambers 9 and 15 continuing to increase, the pressure regulating valves will move forward and backward in rapid sequence, i.e., they open and close alternately. In doing so, they operate in the manner of reducing valves, with the ratio of the pressures in the inlet and outlet chambers being dependent upon the diameter of valve seats 23 and 24.

If valve seats 23 and 24 had the same diameter as the ends of valve tappets 17 and 20 in respective passage bores 55 and 57 in auxiliary housing 31 and insert 40, respectively, the pressure regulating valves would operate as pressure limiters, i.e., even with the pressure in inlet chambers 9 and 15 continuing to increase, the pressure regulating valves would remain closed so long as the control pressure is maintained in outlet chambers 10 and 16.

If the pressure in inlet chambers 9 and 15 is reduced relative to the pressures in outlet chambers 10 and 16, a pressure compensation will occur via the sealing plates 19 and 22 which are designed as check valves. As soon as the pressure in outlet chambers 10 and 16 is below the control pressure, the pressure regulating valves will again open.

Control force F, which determines the control pressure, depends on the position of auxiliary housing 31 within main housing 1. This makes it possible in assembly to introduce auxiliary housing 31 into main housing 1 until a desired control pressure is achieved. Then main housing 1 is closed by means of bottom plate 37, thereby securing auxiliary housing 31 in position.

Annular grooves 32 and 33 on auxiliary housing 31 are of such width that annular chambers 7 and 12 formed by these annular grooves remain connected with inlet 2 and outlet 4, respectively, in any position of auxiliary housing 31 within main housing 1.

Figure 2:
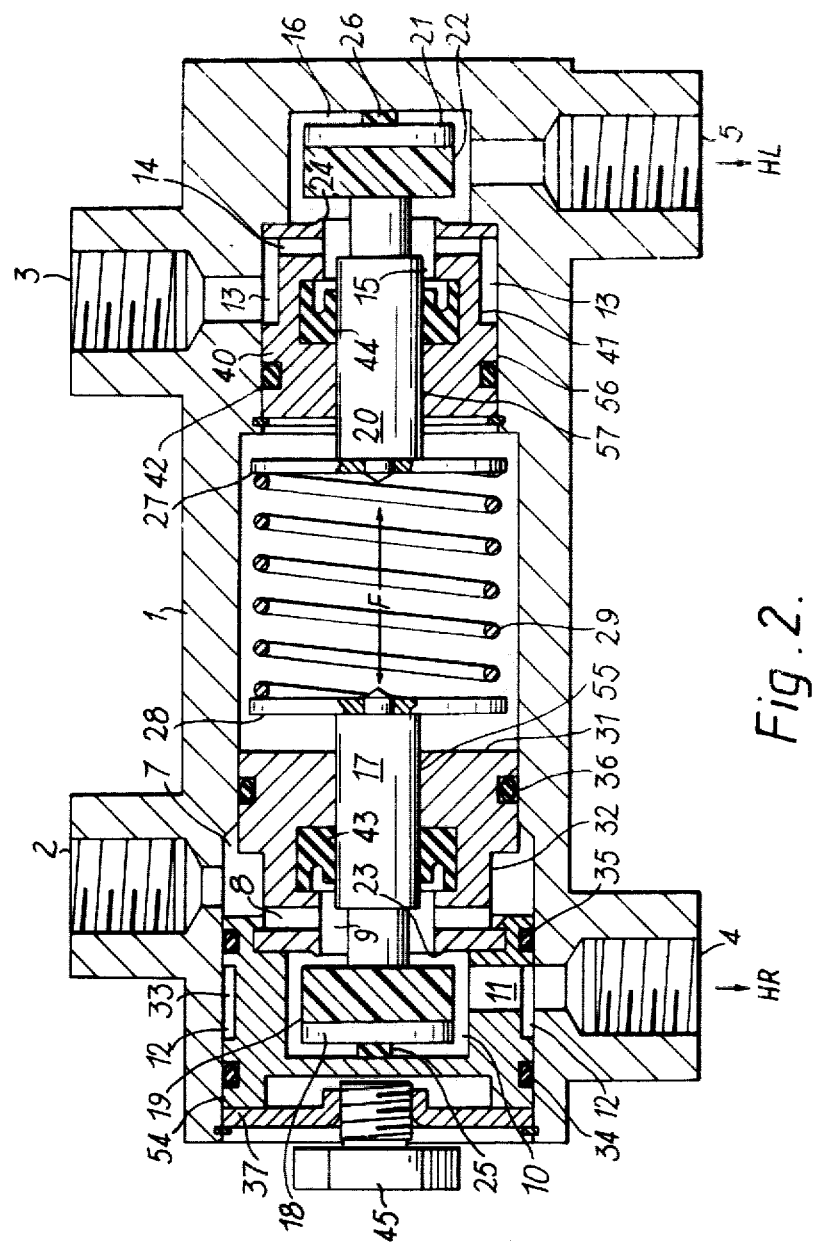
FIG. 2 is a partial longitudinal cross-sectional view of a second embodiment of a dual-circuit pressure regulator in accordance with the principles of the present invention wherein the auxiliary housing is adjustable after assembly of the dual-circuit pressure regulator by means of a screw.

The embodiment illustrated in FIG. 2 differs from the embodiment of FIG. 1 in that bottom plate 37 possesses an adjusting screw 45. This enables the position of auxiliary housing 31 within main housing 1 to be changed subsequently after assembly. The position once adjusted, auxiliary housing 31 can be secured in that position by wedging adjusting screw 45 with bottom plate 37.

In the embodiment of FIG. 3, bottom plate 37 has an external thread 46 cooperating with an internal thread 47 of cylindrical bore 54. This permits again the position of auxiliary housing 31 within main housing 1 to be changed by screwing bottom plate 37 inwardly by a suitable amount. For this purpose, bottom plate 37 has blind-end holes 48 suitable for engagement by a screw tool. The adjustment once made, auxiliary housing 31 can be secured in that position by wedging the rim of bottom plate 37 with main housing 1.

In the embodiment of FIG. 4, the position of auxiliary housing 31 within main housing 1 is continuously variable in response to a reference input, for example, the load of a vehicle, by means of an adjusting lever 49 with a thrust member 50. Adjusting lever 49 is connected to main housing 1 by a pivoted lever 51. Adjusting lever 49 is moved by means of a push rod 52. Thrust member 50 is urged against a bottom of auxiliary housing 31. Movement of adjusting lever 49 in the direction of arrow P will cause displacement of auxiliary housing 31 into main housing 1, thereby increasing the control force of spring 29. Movement of adjusting lever 49 in the reverse direction will cause displacement of auxiliary housing 31 towards the outside by the force of spring 29, thereby reducing the control force of spring 29. The travel of outward displacement of auxiliary housing 31 is limited by a stop ring 53 at the end of main housing. Stop ring 53 thus provides a safety device.

In order to have a possibility of adjusting the lever system 49, 51, 52, thrust member 50 may be designed as an adjustable member, for example, as an adjusting screw.

It is also possible to provide a thrust member 50 which is formed fast with adjusting lever 49, for example, by riveting. In that case, push rod 52 may possess an adjusting thread so that its length is variable.

While I have described above the principles of my invention in connection with specific apparatus it is to be clearly understood that this description is made only by way of example and not as a limitation to the scope of my invention as set forth in the objects thereof and in the accompanying claims.

I claim:
1. A dual-circuit pressure regulator comprising:
   a main housing;
   a first inlet chamber and a first outlet chamber connected to said first inlet chamber disposed in and adjacent one end of said main housing, said first inlet chamber being connected to one pressure circuit of a tandem master cylinder and said first outlet chamber being connected to a wheel brake cylinder of one of a pair of rear wheels of a vehicle;
   a second inlet chamber and a second outlet chamber connected to said second inlet chamber disposed in and adjacent the other end of said main housing, said second inlet chamber being connected to the other pressure circuit of said master cylinder and said second outlet chamber being connected to a wheel brake cylinder of the other of said pair of rear wheels;
   a first pressure regulating valve disposed between said first inlet chamber and said first outlet chamber and loaded with a control force in the valve opening direction of said first valve;
   a second pressure regulating valve disposed between said second inlet chamber and said second outlet chamber and loaded with said control force in the valve opening direction of said second valve which is opposite the valve opening direction of said first valve;
   said first and second valves are closed upon attainment of a control pressure determined by said control force and will influence the pressure in their associated one of said first and second outlet chambers in accordance with a predetermined control behavior upon a further increase of pressure in their associated one of said first and second inlet chambers;
   a single, common spring arrangement disposed in said main housing between said first and second valves to oppositely load said first and second valves with said control force; and
   an auxiliary housing containing at least said first valve disposed in said main housing and slideable therein relative to said second valve to enable adjustment of said control force, said auxiliary housing being adapted to be secured in a fixed position after adjustment of said control force is completed.

2. A regulator according to claim 1, wherein said auxiliary housing is designed like a piston and is disposed in a cylindrical force of said main housing adjacent said one end of said housing.

3. A regulator according to claim 2, wherein said auxiliary housing encloses said first inlet chamber and said first outlet chamber and includes therein an inlet line to connect said first inlet chamber with a first inlet connected to said one pressure circuit of said master cylinder and an outlet line to connect said first outlet chamber with a first outlet connected to said wheel brake cylinder of said pair of rear wheels.

4. A regulator according to claim 3, wherein said auxiliary housing includes a first outer annular groove into which said first inlet line opens, and a second outer annular groove spaced from said first annular groove into which said outlet line opens, the axial distance between said first and second outer annular grooves corresponds to the axial distance between said first inlet and said first outlet.

5. A regulator according to claim 4, wherein said first and second outer annular grooves each have an axial width corresponding at least to the diameter of an associated one of said first inlet and said first outlet plus a predetermined displacement distance of said auxiliary housing within said main housing.

6. A regulator according to claims 2, 3, 4 or 5, wherein said auxiliary housing is urged by said spring arrangement against a stop secured to said main housing adjacent said one end of said main housing.

7. A regulator according to claim 6, wherein said stop includes a bottom plate closing said cylindrical bore.

8. A regulator according to claim 7, wherein said bottom plate includes a substantially cylindrical rim fitting into said cylindrical bore, said rim having an outwardly extending circular projection thereon to engage an annular inner groove in said cylindrical bore.

9. A regulator according to claim 7, wherein said bottom plate has an adjusting screw disposed axially therein abutting said auxiliary housing, said auxiliary housing being displaced upon turning said adjusting screw.

10. A regulator according to claim 7, wherein said bottom plate has an external thread engaging an internal thread in said cylindrical bore.

11. A regulator according to claim 6, wherein
said stop includes a thrust member fastened in a moveable adjusting lever pivotably secured to said main housing.

12. A regulator according to claim 11, wherein
said thrust member is axially adjustable with respect to said adjusting lever.

13. A regulator according to claim 11, wherein
said thrust member is fixed with respect to said adjusting lever and said adjusting lever is actuated by a push rod of variable length.

14. A regulator according to claim 11, wherein
said stop further includes a stop ring secured to said cylindrical bore to provide a safety stop.

15. A regulator according to claim 14, wherein
said thrust member is axially adjustable with respect to said adjusting lever.

16. A regulator according to claim 14, wherein
said thrust member is fixed with respect to said adjusting lever and said adjusting lever is actuated by a push rod of variable length.

17. A regulator according to claims 2, 3, 4 or 5 wherein
each of said first and second valves is a tappet valve having a tappet disposed along a longitudinal axis of said main housing in a spaced coaxial relationship, said tappet of each of said tappet valves extending through an associated one of said first and second inlet chambers with one end of each of said tappets being adjacent each other, said tappet of said first valve passing through an axial bore in said auxiliary housing.

18. A regulator according to claim 17 wherein
each of said one end of each of said tappets carries therein a disc-like plate.

19. A regulator according to claim 18, wherein
said spring arrangement is disposed between each of said disc-like plates.

20. A regulator according to claim 19, wherein
said spring arrangement is a helical compression spring.

21. A regulator according to claim 17, wherein
said spring arrangement is disposed between each of said one end of each of said tappets.

22. A regulator according to claim 21, wherein
said spring arrangement is a helical compression spring.

23. A regulator according to claim 17, wherein
each of said tappet valves include a circular disc-shaped valve body on the other end of said tappet having an annular elastic sealing plate cooperating with an annular valve seat disposed between the associated one of said first and second inlet chambers and the associated one of said first and second outlet chambers.

24. A regulator according to claim 23, wherein
said second inlet chamber and said second valve are disposed in a piston-shaped insert which is disposed and secured in said cylindrical bore adjacent the other end of said main housing, said tappet of said second valve extending through an axial bore in said insert.

* * * * *